Nov. 26, 1968  F. RYCKEBOSCH  3,412,848
REEL CARRYING ELONGATED WIRE ELEMENTS
Filed Oct. 12, 1966  2 Sheets-Sheet 1
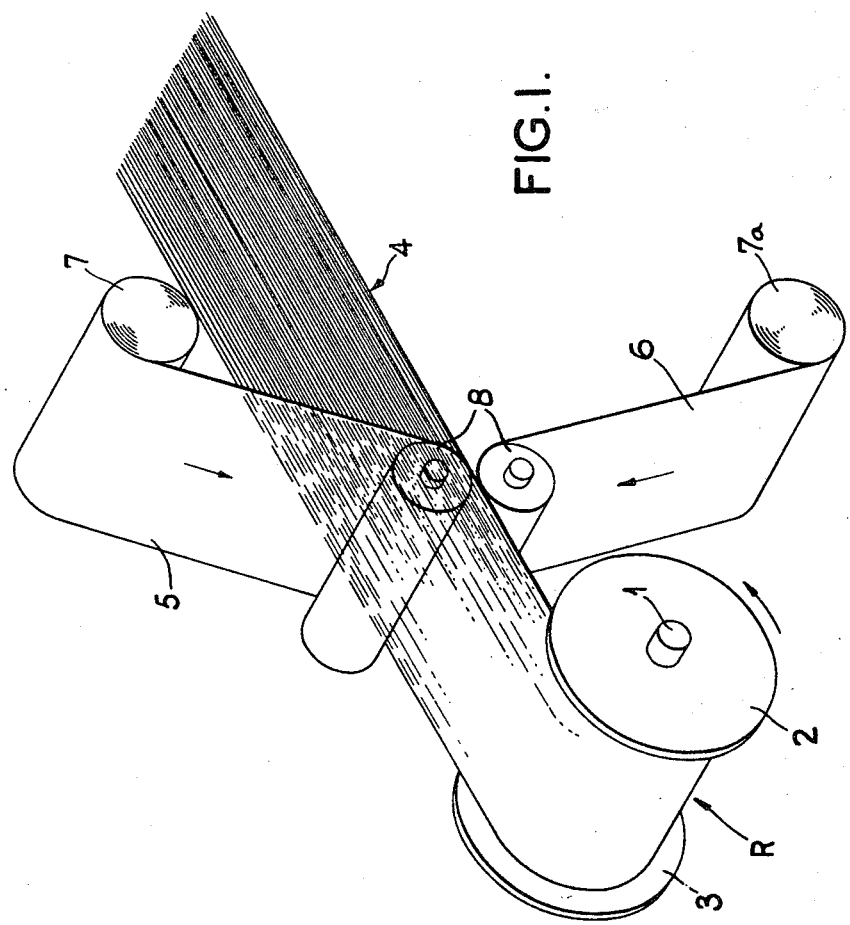
FIG.I.
INVENTOR
Frans Ryckebosch
By
Sparrow and Sparrow
ATTORNEYS Nov. 26, 1968    F. RYCKEBOSCH    3,412,848
REEL CARRYING ELONGATED WIRE ELEMENTS
Filed Oct. 12, 1966    2 Sheets-Sheet 2
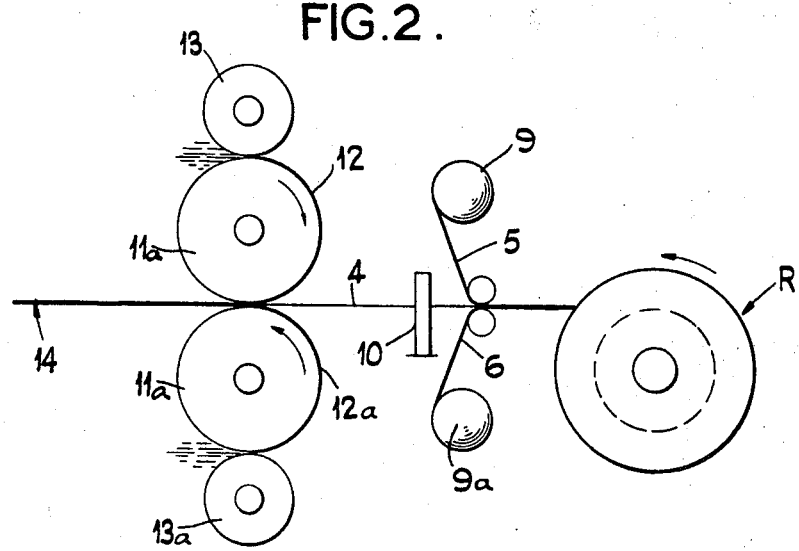
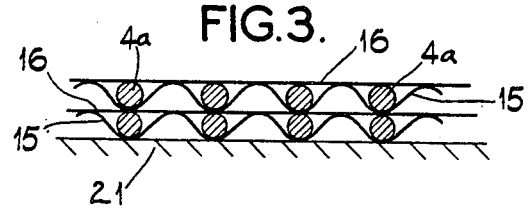
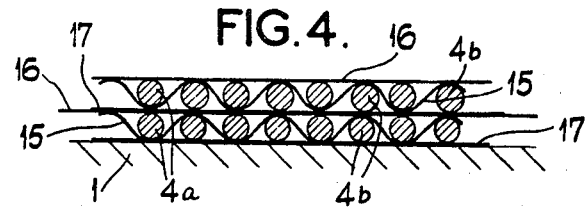
INVENTOR
Frans Ryckebosch
By
Sparrow and Sparrow
ATTORNEYS United States Patent Office 3,412,848
Patented Nov. 26, 1968

3,412,848
REEL CARRYING ELONGATED WIRE ELEMENTS
Frans Ryckebosch, Zwevegem, Belgium, assignor to Trefileries Leon Bekaert, P.V.B.A., a corporation of Belgium
Filed Oct. 12, 1966, Ser. No. 586,164
Claims priority, application Great Britain, Oct. 14, 1965, 43,619/65
15 Claims. (Cl. 206—59)

ABSTRACT OF THE DISCLOSURE

A storage reel carrying a large number of elongated elements such as wires and/or strands of wires in a side by side relation for use in reinforcing flexible sheet material, each element wound on itself and parallel with all of the other elements, a thin sheet of flexible material wound on the reel together with the elements for separating successive layers of elements from each other and for keeping the elements separated and spaced apart from one another.

---

This invention relates to the manufacture of reinforced flexible sheet material and is particularly, but not exclusively, concerned with the manufacture of steel wire reinforced rubber sheet for use, for example, for making vehicle tires.

Steel wire reinforced rubber sheet is formed by introducing parallel strands of wire between two sheets of rubber fed into face-to-face relationship from separate supply sources, e.g. rolls of such sheet, and passing the composite assembly thus formed between calendering rolls to bond the component sheets together with the wire strands between them and thus form a composite reinforced sheet or "sandwich," which is led away for storage and further operational steps, such as for tire manufacturing steps.

Composite sheet thus formed is normally manufactured in great lengths of substantial width and subsequently cut up into pieces to make individual tires, the steel reinforcing wires being laid close together parallel to the length of the composite sheet. As a result a large number of wires, in the order of 600 to 1,000 or more separate strands depending on the width of the sheet being made, have to be fed continuously and at the correct mutual spacing between the component rubber sheets as the latter are brought together face-to-face, and this has led to considerable difficulties in controlling the feeding of the wire strands to the composite sheet forming apparatus.

One system for controlling the feeding of the wire strands simply consists in supplying each strand from an individually rotatably mounted reel via a complicated arrangement of guide pulleys to a comb which aligns all of the strands into a single plane at the desired spacings from one another, from whence the strands are led to sheet forming apparatus.

This system, however, has a number of disadvantages. Thus, 600 to 1,000 or more separately mounted reels of wire take up a very large space in the tire factory and require a substantial labor force to receive, mount, dismount and dispose of the reels at regular intervals, which has obvious economic disadvantages and makes for slow production. Moreover, it is essential that the wires be protected against corrosion during the period elapsing between their original manufacture and their incorporation in the composite sheet; as a result the reels of wire have to be supplied in expensive hermetically sealed containers which must be returned to the wire manufacturer and the space in the tire factory where the reels of wire are mounted during use has to have its atmospheric conditions carefully controlled. Clearly these factors are also disadvantageous from an economic point of view. The packing, storage and transportation of large numbers of reels of wire is also, of course, expensive.

Another system, which obviates many of the disadvantages mentioned above, involves the wires being supplied to the tire manufacturer not on separate reels but in the form of a roll of woven wire mesh of which the warp constitutes the wire strands required for making the composite sheet. These strands are held in their correct relative positions by the weft strands and such wire mesh may therefore be led directly from it storage reel between the component rubber sheets without the provision of a combing step. However, this system also has its disadvantages; in particular, the weft strands do not serve any useful purpose in the composite sheet and indeed increase its weight to an undesirable extent, while the manufacture of the wire mesh is a slow and expensive process. Also, the rolls of mesh must be interchanged during operation if it is desired to form a composite sheet in which the density or individual thicknesses of the wire reinforcing strands varies along its lengths. Also the presence of the weft strands obstructs the movement of the reinforcing warp strands to new relative positions as is desirable during the subsequent shaping of tires from the composite sheet.

It is a primary object of the present invention to provide means whereby most of the above disadvantages of earlier systems are obviated or substantially reduced.

Thus, according to the invention there is provided a storage reel carrying a large number of separate unconnected strands of wire suitable for use in reinforcing flexible sheet material, each of such strands being wound on itself in substantial parallelism with all of the other strands, at least one thin sheet of flexible material extending axially along the reel being wound thereon together with said strands whereby to separate successive layers or coils of the strands from each other.

By the term "a large number" of strands of wire employed above we mean a number of strands sufficient to provide all, or a substantial proportion of, the reinforcement for reinforced composite sheet material of a width in which it is commonly manufactured. As already mentioned, such a composite sheet may contain in the order of 600 to 1,000 or more separate wire strands and it is envisaged that a reel according to the invention may hold this number of strands or, possibly, a large fraction such as ½ or ⅓ of such number in which latter case, of course, two or three reels will be supplied together to provide the desired number of wire strands in combination.

The strands of wire will, of course, be wound on the reel in any specific order or ararngement in which they are to be supplied to the calendering rolls for combination with the component sheets of flexible material, such as rubber, which together with the wires are to make up the final reinforced composite sheet. The thin sheet or each thin sheet of flexible material separating the neighboring layers of wire strands on the reel will preferably comprise a single length of material so that the sheet or each sheet may be stripped from the wire in continuous fashion as the wire strands are removed from the reel in use.

In a comparatively simple form of the invention, each separate roll of wire on the reel is laid immediately adjacent and in contact with its neighbor and a single or double layer of said thin flexible sheet material in flat form is provided between the neighboring layers of wire on the reel. Such an arrangement has the advantage that a requisite number of wire strands may be provided packed close to each other on a comparatively short reel, which is advantageous from the points of view of the cost of the reel itself and its storage and transportation, and the ease with which it may be handled. It is, however, necessary with such an arrangement for the wire strands to be passed through a comb between the reel and the calendering rolls to separate the strands to their desired mutual spacings before they are incorporated in the composite sheet.

In this form of the invention the main purpose of the layer of thin flexible sheet material provided between each layer of wire on the reel is to absorb any surface irregularities in such layers which may result from slight variations in the thickness of the individual wire strands and which variations, if not absorbed in this way, would lead to differences in the lengths of the respective wire strands wound on the reel; any such differences in the lengths of the respective strands are undesirable as if one or more of the rolls of wire on the reel were to become prematurely exhausted their absence would possibly not be noticed among the large number of wire strands in use, but might nevertheless lead to weakness in the finished product. To achieve this effect, the said sheet material is preferably of a resilient nature and may consist of a suitably resilient synthetic plastic material, rubber, textile material or paper for example. The sheet material also serves to protect the wire against corrosion by the atmosphere to some extent.

In the above described form of the invention the spacing between the terminal flanges of the reel itself is preferably adjustable so that, when all of the rolls of wire have been wound on the reel, one or other of such flanges may be moved inwardly and secured so as to compact the rolls of wire against one another and thus prevent any undesired movement thereof lengthwise of the reel.

In another form of the invention the individual rolls of wire on the reel are spaced from one another by distances which correspond to the desired spacings of the wire strands when incorporated in a composite reinforced sheet, means being provided for maintaining the individual rolls of wire at such mutual spacings on the reel. Although such an arrangement requires the length of the reel itself to be substantially greater than is necessary when the rolls are in contact with one another, it has the advantage over the latter arrangement that no combing step is necessary before the wires are led between the calendering rolls in use; the reel according to the invention may therefore be placed much closer to the calendering rolls than it can be when an intermediate combing step is necessary, with a consequent substantial saving in space.

The means for maintaining the individual rolls of wire at their desired mutual spacings may, as in a preferred form of the invention, be provided by folds, creases or undulations in the, or one of the, said thin sheet or sheets of flexible material provided between adjacent layers of wire on the reel.

Such sheet of flexible material could, for example, be creased in zigzag or concertina fashion across its lengths, each of the troughs or furrows thus formed therein carrying a single wire strand at a predetermined spacing from its neighboring strands in the adjacent troughs. In a preferred embodiment the said sheet is corrugated so as to be of substantially sinusoidal configuration in transverse cross-section, the wire strands lying, as mentioned above, in the troughs of the corrugations.

In this latter form of the invention at least one further thin sheet of flexible material will preferably be interposed between each adjacent layer of wire on the reel, this further sheet being flat and lying across the crests of the folds, creases or corrugations of the first-mentioned sheet so as to locate the wire strands in the troughs or furrows thereof. If desired further wire strands could then be laid beneath the crests of the first-mentioned sheet, such further strands seating on the interposed flat sheet and each lying immediately above a crest of the folded, creased or corrugated sheet associated with that layer of wire immediately beneath it.

It will be understood that in such an arrangement the folded, creased or corrugated sheet positively separates and spaces the individual rolls of wire from one another by distances which may conveniently correspond to those to be provided between the wire strands in the said composite sheet material, as well as separating the adjacent layers of wire from one another.

In addition to spacing and locating the wire strands the intermediate sheets of flexible material will also serve to absorb any variations in the thickness of the individual wire strands, for the purpose already mentioned. In this second form of the invention the spacing between the terminal flanges of the reel itself need not be adjustable as the individual rolls of wire on the reel are located by the said intermediate sheets and do not have to be compacted together to prevent their partial collapse.

Where a further thin sheet of flexible material is interposed between the layers of wire on the reel as aforesaid, this sheet will preferably be adhered to the crests of the said creased, folded or corrugated sheet so as to form a series of sealed furrows, grooves or tubes in which the wires lie; the strength of the adhesive bond between the sheets will not, however, be so great as to prevent their being stripped apart without difficulty to expose the wires when they are being put to use. In a preferred form of the invention a flat sheet of such thin flexible material is adhered to both faces of the creased, folded or corrugated sheet to increase its strength. The reels according to the invention may very conveniently be made up in the wire manufacturer's factory from wire led directly from the wire drawing machinery. The reels will usually be hermetically packed and sealed as soon as they have been assembled, to prevent deterioration of the wire during subsequent storage and transportation, but it will not generally be necessary for the atmospheric conditions in the building where the wire is put to use to be very strictly controlled, as has been the case in the past, as the convenient manner in which the wires are provided for use will greatly reduce the time for which they are exposed to the atmosphere before being incorporated in composite reinforced sheet material.

It is readily understood that the invention may embody the use of elongated elements of material other than or together with wire filaments or strands, natural or synthetic, which are suitable for the purpose intended.

In order that the invention may be more readily understood, two embodiments of the same will now be described by way of example and with reference to the accompanying drawings in which:

FIG. 1 is a perspective view of a first embodiment of a storage reel according to the invention, at a late stage in its process of assembly;

FIG. 2 is a diagrammatic side elevation illustrating the mode of use of the reel of FIG. 1;

FIG. 3 is a diagrammatic cross-sectional view of some of the wires and interposed sheet material wound on a storage reel according to a second embodiment; and FIG. 4 is a view similar to FIG. 3 but showing a modification.

The first embodiment of the invention comprises a reel R having a central core 1 and two end flanges 2 and 3 one of which is adjustable along such core to vary the spacing between the flanges. A plurality of wire strands 4, e.g., in the order of 1,000, are wound on the reel side by side, i.e., each strand is wound on itself but in contact with its neighboring strand or strands. Two strips of textile or other suitable material 5 and 6 each wide enough to cover all of the wire strands and of lengths equal to that of strands are laid with them on the reel so as to enclose each adjacent layer of wire thereon and to separate it from its neighbors. The strands 4 are all of substantially equal length to insure that all of the individual rolls of wire on the reel will become exhausted at substantially the same time, any irregularities in the diameters of the strands being taken up by the intermediate layers of resilient textile material.

As illustrated, the strips 5 and 6 are supplied from rolls 7, 7a, and are combined with the wires by being passed between a pair of rollers 8. The storage reel itself will, of course, be driven to simultaneously wind up the wires and textile strips thereonto.

When the reel of wire strands is being made up, once the desired number of strands has been wound on it the adjustable flange of the reel is moved inwardly to compact the individual rolls against one another and is secured in such position.

The reel will be made up in a wire manufacturer's factory, the wire strands 4 being led directly from the wire drawing machinery onto the reel by way of a comb and the strips of textile material 5 and 6 being simultaneously led onto the reel from their storage rolls 7. When the wire is put to use in a tire factory, for example, as shown in FIG. 2, the textile strips 5 and 6 will be led away onto storage rolls 9, 9a as the wire strands 4 are drawn off the reel; the strands will be passed through a comb 10 to separate them to their desired mutual spacings before they are passed to calendering rolls 11a to be received between rubber sheets 12, 12a from storage rolls 13, 13a to form a reinforced composite sheet 14.

A second embodiment of the invention comprises a reel of greater length than that of the first embodiment, whose terminal flanges are both fixed in position. In this embodiment each of the individual wire strands 4, which are again of substantially equal length, is wound on itself but the strands are spaced from one another by the desired distances by which they are to be separated in the composite reinforced sheet material of which they are to form part.

Thus, referring to FIG. 3, the layers of wire on the reel core 21 are laid in the troughs of a strip of corrugated suitable materials, for example, synthetic plastic material, such as polyethylene, of substantially sinusoidal form in transverse cross-section, such strip being of such a width as to fit closely between the flanges of the reel. The layers of wire are further separated by a strip of suitable flat sheet 16, for example, synthetic plastic sheet material, such as polyethylene, which overlies and is adhered to the crests of the corrugated sheet 15 so as to define therewith a series of parallel continuous channels each of which contains and locates a single wire strand 4a.

The reel of wire of this embodiment is again made up in the wire manufacturer's factory, the wire strands being led to the reel directly from the wire drawing machinery via a comb (not shown) which sets them at their desired spacings. Between the comb and the reel the corrugated and flat sheets of plastic material are led from storage rolls (not shown) to the underside and upperside respectively of the assembly of wire strands and the assembly of wire strands and plastic sheet is passed between a pair of pressure rollers (not shown) to bond the sheets together along the crests of the corrugated sheet, to which a suitable adhesive has already been applied. The assembly is then wound on the reel.

At the tire manufacturer's factory, for example, the reverse procedure is carried out. The assembly of wire strands and plastic sheets is led off the reel and the sheets are stripped therefrom and led to storage rolls; the wire strands are then led directly between the sheets of rubber, for example, with which they are to be combined, and the latter assembly is passed between calendering rolls to form the finished composite reinforced sheet material. The wire strands may, if desired, be passed through a comb (not shown) before being led to the calendering rolls, to insure that the correct spacing between them is maintained.

If desired and as shown in FIG. 4, a further flat sheet of suitable material 17, such as synthetic plastic material, could be adhered to the underside of the corrugated sheet, i.e., to the underside of the troughs of the latter, to increase the strength of the assembly. If desired, and as illustrated, further wire strands 4b may be laid beneath the crests of the corrugated sheet 15. The plastic or other suitable material employed in all of the sheets will preferably be of a somewhat resilient nature so as to absorb any variations in the diameters of the wire strands, for the reason already referred to.

It will thus be seen that the invention provides convenient and efficient means for supplying wire strands to a manufacturer of composite reinforced sheet material, which obviates many of the economic and operational disadvantages of previous proposals. The invention is, of course, applicable to the manufacture of all manner of composite reinforced sheet materials in addition to vehicle tires, such as composite reinforced plastic sheet material for example.

What is claimed is:

1. A storage reel carrying a plurality of separate unconnected elongated wire elements suitable for use in reinforcing flexible sheet material, each of said elements being wound on itself in layers in substantial parallelism with all of the other of said elements constituting a plurality of adjacently disposed coils of elements, a single, thin sheet of flexible material freely laid between consecutive layers of said elements separating one layer of said elements from the next layer of said elements, said sheet and said layers of elements being wound together simultaneously.

2. A storage reel according to claim 1, wherein each of said separate coils of elongated elements on said reel is laid immediately adjacent and in contact with its neighbor and a layer of thin flexible sheet material in flat form is provided between the neighboring layers of elongated elements on said reel.

3. A storage reel according to claim 2, wherein at least one of the terminal flanges of the reel is adjustable axially thereof whereby, when all of said coils of said elements have been wound on said reel, at least one of said flanges may be moved inwardly and secured so as to compact said coils of said elements against one another.

4. A storage reel according to claim 1, wherein the individual coils of said elements on said reel are spaced from one another by distances which correspond to the desired spacings of said elements when incorporated in a composite reinforced sheet, means being provided for maintaining the individual coils of said elements at such mutual spacing on said reel.

5. A storage reel carrying a plurality of separate unconnected elongated wire elements suitable for use in reinforcing flexible sheet material, each of said elements being wound on itself in layers in substantial parallelism with all of the other of said elements constituting a plurality of adjacently disposed coils of elements, at least one thin sheet of flexible material extending axially along said reel, said sheet of flexible material being wound on said reel together with said elements whereby to separate successive layers of said elements from each other, said sheet material being resilient, the individual coils of elements on said reel being spaced from one another by distances which correspond to the desired spacings of said elements when incorporated in a composite reinforced sheet and means for maintaining said coils of elements at said spacings on said reel.

6. A storage reel according to claim 5, wherein said means for maintaining the individual coils of elements at said spacings being constituted by alternate crests and furrows in at least one sheet of flexible material provided between adjacent layers of wire on said reel.

7. A storage reel according to claim 5, wherein said means comprises at least one corrugated sheet of flexible material providing a sinusoidal configuration in transverse cross-section, said wire elements lying in the furrows of the corrugations.

8. A storage reel carrying a plurality of separate unconnected elongated elements suitable for use in reinforcing flexible sheet material, each of said elements being wound on itself in layers on said reel in substantial parallelism with all of the other of said elements constituting a plurality of adjacently disposed coils of elements, at least one thin sheet of flexible material extending axially along said reel, said sheet of flexible material being wound on said reel together with said elements whereby to separate successive layers of said elements from each other, the individual coils of elements on said reel being spaced from one another by distances which correspond to the desired spacings of said elements when incorporated in a composite reinforced sheet, and means for maintaining the individual coils of said elements at said spacings on said reel, said means being constituted by alternate crests and furrows in at least one sheet of flexible material provided between adjacent layers of said elements on said reel.

9. A storage reel according to claim 8, wherein at least one further thin sheet of flexible material in addition to said crested and furrowed sheet is interposed between each adjacent layer of elongated elements on said reel, said further sheet being flat and lying across said crested and furrowed sheet so as to locate the elongated elements in the furrows thereof.

10. A storage reel according to claim 9, wherein said further sheet is adhered to the crests of the said crested and furrowed sheet so as to form a series of sealed tubes in which the elongated elements lie.

11. A storage reel according to claim 10, including further elongated elements laid beneath the crests of the said crested and furrowed sheet, such further elements seating on the interposed flat sheet and each lying immediately above a crest of said crested and furrowed sheet associated with that layer of elongated elements immediately beneath it.

12. A storage reel according to claim 9, including further elongated elements laid beneath the crests of the said crested and furrowed sheet, such further elements seating on the interposed flat sheet and each lying immediately above a crest of said crested and furrowed sheet associated with that layer of elongated elements immediately beneath it.

13. A storage reel according to claim 12, wherein a thin flat sheet of flexible material, in addition to said crested and furrowed sheet and said further thin flat sheet is adhered beneath the troughs of the said crested and furrowed sheet so as to form a further series of sealed tubes in which the said further elongated elements lie.

14. A storage reel according to claim 8, which is hermetically packed and sealed.

15. A storage reel carrying a plurality of separate unconnected elongated elements suitable for use in reinforcing flexible sheet material, each of said elements being wound on itself in layers on said reel in substantial parallelism with all of the other of said elements constituting a plurality of adjacently disposed coils of elements, at least one thin sheet of flexible material extending axially along said reel, said sheet of flexible material being wound on said reel together with said elements whereby to separate successive layers of said elements from each other, the individual coils of elements on said reel being spaced from one another by distances which correspond to the desired spacings of said elements when incorporated in a composite reinforced sheet, and means for maintaining the individual coils of said elements at said spacings on said reel, said means comprising at least one sheet of flexible material which is corrugated so as to be of substantially sinusoidal configuration in transverse cross-section, said elements lying in the troughs of the corrugations.

References Cited

UNITED STATES PATENTS

| | | | |
|---|---|---|---|
| 2,435,093 | 1/1948 | Mitschrich | 206—59 |
| 2,340,116 | 1/1944 | Ferguson et. al. | 206—59 |
| 2,454,821 | 11/1948 | McKee. | |
| 2,798,602 | 7/1957 | Riall | 206—63.3 |
| 2,909,277 | 10/1959 | Thiers et. al. | 206—59 X |
| 3,135,478 | 6/1964 | Harlander | 242—117 |
| 3,295,778 | 1/1967 | Fiorentino et. al. | 242—71.9 X |

MARTHA L. RICE, *Primary Examiner.*